March 29, 1932. G. L. SWABB 1,851,068
LOCOMOTIVE
Filed April 17, 1930 2 Sheets-Sheet 1
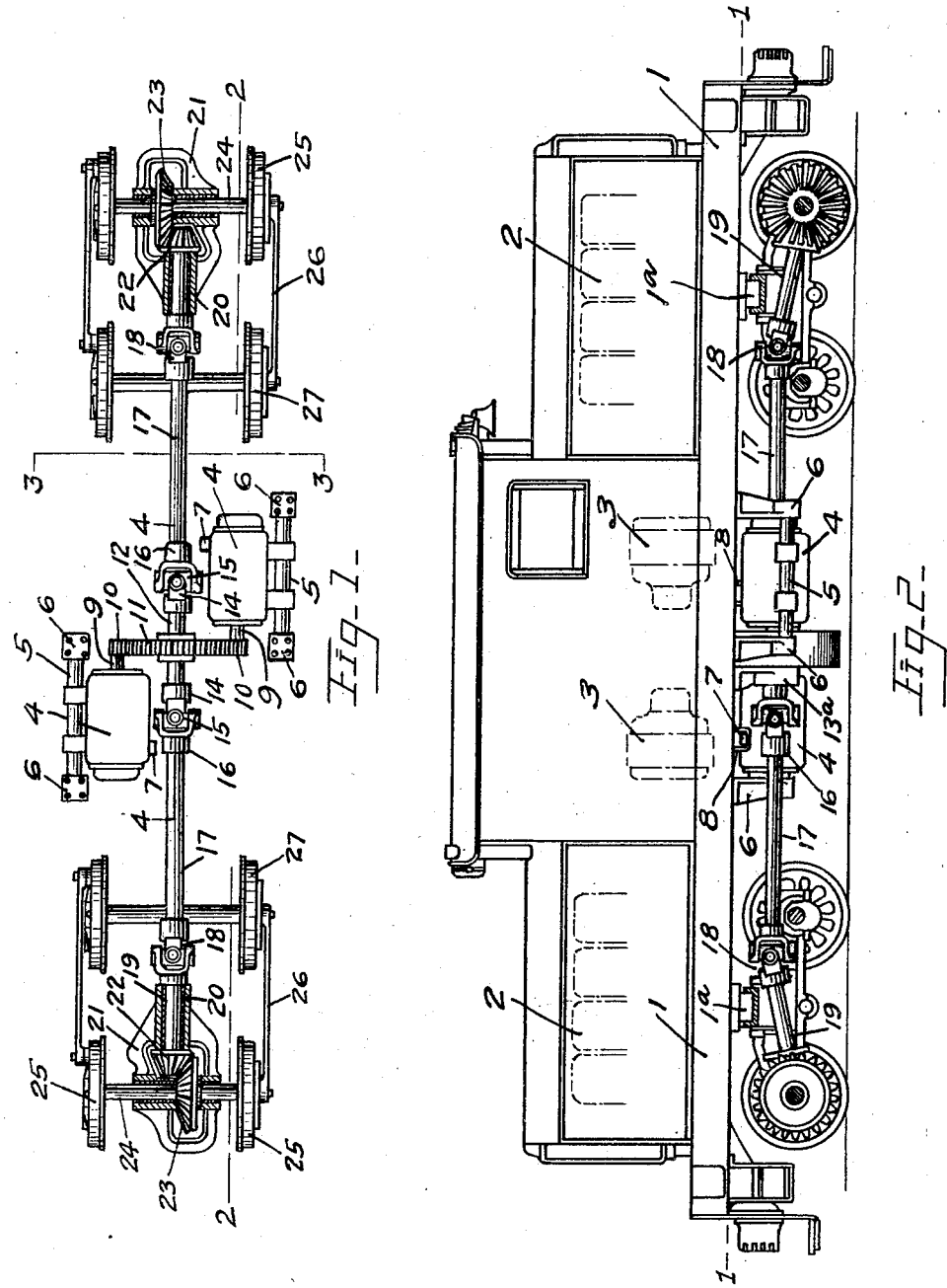
INVENTOR.
George L. Swabb
BY
ATTORNEYS.

March 29, 1932.  G. L. SWABB  1,851,068

LOCOMOTIVE

Filed April 17, 1930  2 Sheets-Sheet 2

INVENTOR.
George L. Swabb
BY
ATTORNEYS.

Patented Mar. 29, 1932

1,851,068

UNITED STATES PATENT OFFICE

GEORGE L. SWABB, OF ERIE, PENNSYLVANIA, ASSIGNOR TO HEISLER LOCOMOTIVE WORKS, OF ERIE, PENNSYLVANIA, A CORPORATION OF PENNSYLVANIA

LOCOMOTIVE

Application filed April 17, 1930. Serial No. 445,131.

Locomotives utilizing primary motors, such as oil engines, and delivering power through generators connected with the final driving motors present some problems peculiar to this drive. The present invention is designed to improve the driving connection of such a locomotive. Preferably the locomotive involves a double driving mechanism, either unit of which is operable without the other so that with any failure of one of the driving units the locomotive can function under the half power of the other unit. The invention also contemplates a ready disengagement of one of the driving connections and also a convenient means of mounting the motors and also means of conveying their movement to the driving axles of the locomotive. Features and details of the invention will appear from the specification and claims.

A preferred embodiment of the invention is illustrated in the accompanying drawings as follows:—

Fig. 1 shows a plan view of the locomotive, the frame being removed.

Fig. 2 a side elevation of the locomotive.

Figure 3:
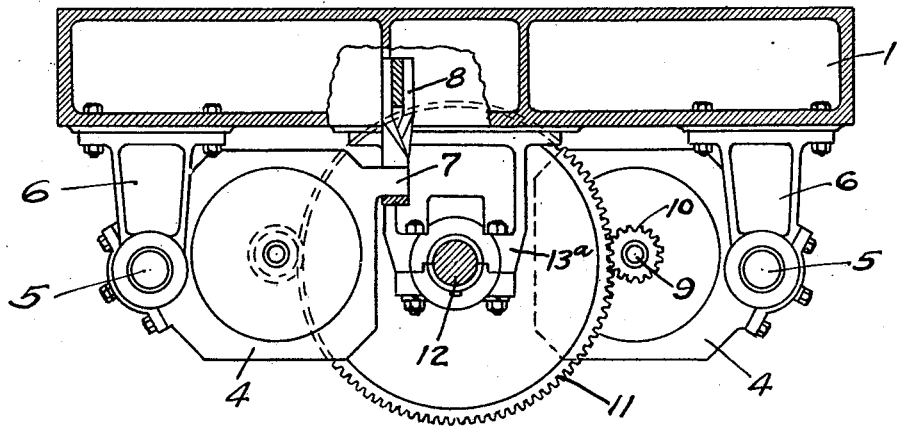

Fig. 3 an enlarged section on the line 3—3 in Fig. 1.

Figure 4:
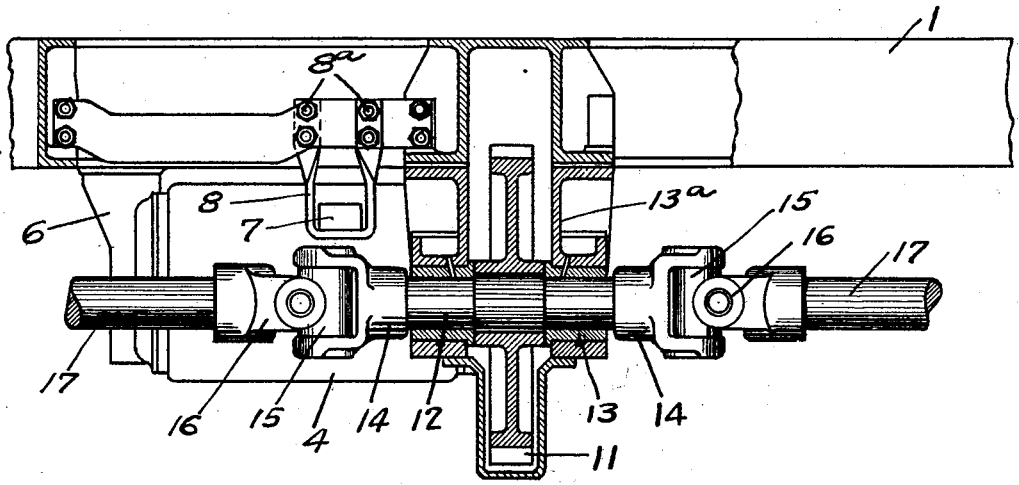

Fig. 4 an enlarged section on the line 4—4 in Fig. 1.

1 marks the engine frame, 2 primary motors, such as oil engines, one at each end of the frame and 3—3 electric generators, one driven by each of the motors 2. The generators are connected with electric motors 4. These motors are hung at their outer edges on shafts 5, the shafts being carried by brackets 6. The inner edges of the motors have projections 7 which rest on U-straps 8.

Driving shafts 9 of the motors are provided with pinions 10 and these pinions drive a gear 11. The gear 11 is fixed on a longitudinal shaft 12. The shaft 12 is journaled in bearings 13 carried by brackets 13a. The shaft 12 has a fork 14 at each end in which is arranged a block 15 and on which is journaled a fork 16 completing the universal joint. Each fork 16 is connected with a shaft 17 which terminates in a universal joint 18. The universal joints 18 are connected with shafts 19 journaled in bearings 20 in a frame 21 mounted on a driving axle 24. A beveled gear 22 is fixed on the shaft 19 and meshes with a beveled gear 23 on the driving axle forming a driving connection between the longitudinal shaft and the axle. Driving wheels 25 are fixed on the axle 24 and are connected by connecting rods 26 with drive wheels 27. These drive wheels support the frame through truck frames 1a.

When one of the driving units fails in any way the motor 4 of that unit can be disengaged from the strap 7 and allowed to swing down thus disengaging the pinion 10 of such motor from the gear 11, bolts 8a permitting such removal.

The structure makes a particularly well-balanced one. The driving motors at opposite sides of the frame balance the load at the sides and the longitudinal drive places the weight centrally thus maintaining the center of gravity at the center and thus giving greater stability to the locomotive.

The structure is particularly advantageous in the tractive effort it is capable of producing. It will be noted that there are four driving axles all locked together. In consequence if there are very local conditions and a tendency to slip as to any one axle there is still sufficient tractive connection through the other axles to arrest a continued slipping of the wheels on the axle so started. With these axles so connected it is particularly desirable in order to maintain a full tractive effort to distribute the weight over all of the wheels and to maintain that weight constant. In this way the full power of the locomotive is made available and slipping reduced to a minimum.

What I claim as new is:—

1. In a locomotive, the combination of a frame; a driving axle on which the frame is mounted; a longitudinal shaft driving the axle; motors at each side of the longitudinal shaft; gear connections between the shaft and the motors; and hinge mountings for the motors, said gear connections being adapted to be broken with the swinging of the motors on the mountings.

2. In a locomotive, the combination of a frame; a driving axle on which the frame is mounted; a longitudinal shaft driving the axle; motors at each side of the longitudinal shaft; gear connections between the shaft and the motors; and hinge mountings at the outer sides of the motors, said gear connections being adapted to be broken with the swinging of the motors on the mountings.

3. In a locomotive, the combination of a frame; a driving axle on which the frame is mounted; a longitudinal shaft driving the axle; motors at each side of the longitudinal shaft; gear connections between the shaft and the motors; and hinge mountings for the motors at the outer sides of the motors; and straps securing the motors at their insides.

4. In a locomotive, the combination of a frame; a truck at each end of the frame supporting the same, each truck comprising two axles with wheels; a longitudinal shaft driving one of the axles of each truck, said shaft connecting said axles to drive in unison; driving connections between the axles on each truck; a gear on the longitudinal shaft; and an electric motor having a gear connection with said gear on the shaft, the power system on the locomotive maintaining a substantially constant balanced load on said axles.

5. In a locomotive, the combination of a frame; a truck at each end of the frame supporting the same, each truck comprising two axles with wheels; a longitudinal shaft driving one of the axles of each truck, said shaft connecting said axles to drive in unison; driving connections between the axles on each truck; a gear on the longitudinal shaft; an electric motor having a gear connection with said gear on the shaft; an electric generator mounted on the frame; and an internal combustion engine driving said generator, said power system maintaining a substantially constant balanced load on said axles.

In testimony whereof I have hereunto set my hand.

GEORGE L. SWABB.